(12) United States Patent
Katano

(10) Patent No.: US 8,837,773 B2
(45) Date of Patent: Sep. 16, 2014

(54) APPARATUS WHICH DETECTS MOVING OBJECT FROM IMAGE AND METHOD THEREOF

(75) Inventor: Yasuo Katano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 13/218,813

(22) Filed: Aug. 26, 2011

(65) Prior Publication Data

US 2012/0057748 A1 Mar. 8, 2012

(30) Foreign Application Priority Data

Sep. 2, 2010 (JP) .................................. 2010-196872

(51) Int. Cl.
*G06K 9/00* (2006.01)
*G06T 7/20* (2006.01)
(52) U.S. Cl.
CPC ....... *G06T 7/204* (2013.01); *G06T 2207/20076* (2013.01); *G06T 2207/30196* (2013.01)
USPC ........................................................ 382/103
(58) Field of Classification Search
None
See application file for complete search history.

(56) References Cited

FOREIGN PATENT DOCUMENTS

| JP | 2006-79272 A | 3/2006 |
|---|---|---|
| JP | 2007-164720 A | 6/2007 |
| JP | 2008-225734 A | 9/2008 |

OTHER PUBLICATIONS

Zhu et al. (Jun. 2005) "An integrated framework of vision-based vehicle detection with knowledge fusion." Proc. 2005 IEEE Intelligent Vehicles Symp., pp. 199-204.*
Comaniciu, D. (Jun. 2003) "Nonparametric information fusion for motion estimation." Proc. 2003 IEEE Comp. Soc. Conf. on Computer Vision and Pattern Recognition. vol. I pp. 59-66.*
Walk et al. (Sep. 2010) "Disparity statistics for pedestrian detection: combining appearance, motion, and stereo." LNCS 6316, pp. 182-195.*
Felzenswalb et al. (Sep. 2010) "Object detection with discriminatively trained part based models." IEEE Trans. on Pattern Analysis and Machine Intelligence, vol. 32 No. 9, pp. 1627-1645.*

(Continued)

*Primary Examiner* — Barry Drennan
(74) *Attorney, Agent, or Firm* — Canon USA, Inc. IP Division

(57) ABSTRACT

An image processing apparatus includes an input unit configured to input a plurality of time-sequential still images, a setting unit configured to set, in a still image among the plurality of still images, a candidate region that is a candidate of a region in which an object exists, and to acquire a likelihood of the candidate region, a motion acquisition unit configured to acquire motion information indicating a motion of the object based on the still image and another still image that is time-sequential to the still image, a calculation unit configured to calculate a weight corresponding to an appropriateness of the motion indicated by the motion information as a motion of the object, a correction unit configured to correct the likelihood based on the weight, and a detection unit configured to detect the object from the still image based on the corrected likelihood.

17 Claims, 8 Drawing Sheets

(56) References Cited

OTHER PUBLICATIONS

Zhu et al. (Jun. 2006) "Fast human detection using a cascade of histograms of oriented gradients." Proc. 2006 IEEE Conf. on Computer Vision and Pattern Recognition.*

Hu et al. (Nov. 2009) "Foreground recognition in video based on bag-of-words model." Proc. 2009 IEEE Chinese Conf. on Pattern Recognition.*

Pedro Felzenszwalb, et al.; "A Discriminatively Trained, Multiscale, Deformable Part Model;" Computer Vision and Pattern Recognition, 2008, CVPR 2008, IEEE Conference on Publication Date: Jun. 22-28, 2008; pp. 1-8.

Takeuchi, et al., "Vehicle Tracking Using Deformable Model and Particle Filters", The Institute of Electronics, Information and Communication Engineers, IEICE Technical Report, ITS2009-37-ITS2009-84, Feb. 15-16, 2010, pp. vol. 109, No. 414, pp. 1-9.

* cited by examiner

APPARATUS WHICH DETECTS MOVING OBJECT FROM IMAGE AND METHOD THEREOF

BACKGROUND OF THE INVENTION

1. Field of the Invention

The present invention relates to an apparatus that detects a moving object from an image, and a method thereof.

2. Description of the Related Art

There is a method for detecting a moving object such as a person or a car in time-sequential images by previously extracting, from the images, regions in which there is motion and then performing detection. Such a detection method is effective in terms of processing speed and accuracy.

There are various methods for performing human detection using still images, such as Histograms of Oriented Gradients (HOG)+AdaBoost method. Such methods perform human detection using only a feature of a shape or a texture, so that misrecognition may occur as a result of noise, an incidental texture, or an arrangement of the object. More specifically, misrecognition may occur when there is an object that is visually similar to the object to be detected, or when a similar feature is accidentally generated at a certain time. However, such misrecognition can usually be prevented by using motion information.

Methods for extracting moving regions areas follows. A background difference method extracts a target region based on information on a difference between previously prepared background information and an image of the current frame. An interframe difference method extracts changing components between frames from continuous frames. An optical flow method uses a Lucas-Kanade algorithm or block matching.

However, it is difficult for an object detection method based on only extraction of motion information to perform accurate detection in cases as described below. Accurate detection is difficult when a noise component such as a shadow or lighting fluctuation is included in the image, when the background changes such as trees swaying in the wind, or when the background information changes due to movement of a camera.

To solve such a problem, there is a method in which a region of interest (ROI) is previously limited based on the motion information, and the object is detected by performing template matching with respect to the ROI.

For example, Japanese Patent Application Laid-Open No. 2007-164720 discusses detecting a head of a person by applying an ellipse to an image region extracted by performing the background difference method. The detection accuracy of the object is thus improved by extracting the moving region and performing template matching.

Further, Japanese Patent Application Laid-Open No. 2006-79272 and Japanese Patent Application Laid-Open No. 2008-225734 discuss detecting a person by quantifying the feature of the motion.

However, the technique discussed in Japanese Patent Application Laid-Open No. 2007-164720 assumes that the object is moving, so that the object cannot be detected if the object has stopped moving. The stationary detection object may be extracted using the background difference method. In such a case, it is necessary to sequentially update the background information to perform accurate detection, so that if the detection object has stopped for a predetermined length of time, the detection target becomes included in the background information. The object cannot thus be detected.

Further, Japanese Patent Application Laid-Open No. 2006-79272 is directed to selecting a person who has fallen while walking, and Japanese Patent Application Laid-Open No. 2008-225734 is directed to selecting an abnormal action in an elevator, i.e., only specific actions. The techniques cannot detect motions other than such specific actions. Further, if there is motion other than that of the detection object, such as a car passing in the background out of doors, it becomes difficult to perform human detection using the motion information.

As described above, when the detection object moves and stops, the detection object cannot be accurately detected using the conventional techniques. For example, when human detection is to be performed in an ordinary environment, there are many situations in which the person does not move. As a result, human detection cannot be performed using only the motion information, or the detection accuracy becomes lowered due to usage of the motion information.

However, in a system that performs human detection in an image, the detection accuracy is expected to be improved using the motion information in addition to the shape information in still images. There is thus a demand for a technique using the motion information which solves the problem of misrecognition or disability of detection that occurs when only performing detection using the still images.

SUMMARY OF THE INVENTION

The present invention is directed to detecting a moving object without lowering the accuracy in detecting a stationary object.

According to an aspect of the present invention, an image processing apparatus includes an input unit configured to input a plurality of time-sequential still images, a setting unit configured to set, in a still image among the plurality of still images, a candidate region that is a candidate of a region in which an object exists, and to acquire a likelihood of the candidate region, a motion acquisition unit configured to acquire motion information indicating a motion of the object based on the still image and another still image that is time-sequential to the still image, a calculation unit configured to calculate a weight corresponding to an appropriateness of the motion indicated by the motion information as a motion of the object, a correction unit configured to correct the likelihood based on the weight, and a detection unit configured to detect the object from the still image based on the corrected likelihood.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

According to an exemplary embodiment of the present invention, human figures will be described as a detection object. Since the human figure is a moving object, it is effective to use the motion information in performing detection. However, it is not necessary for the human figure to be constantly moving.

According to the exemplary embodiments of the present invention, if there is no motion information, a detection result acquired using an image feature is employed. On the other hand, if there is motion information, it is evaluated whether the motion information is appropriate as the motion of the detection object. Misdetection or no detection can thus be reduced.

Figure 1:
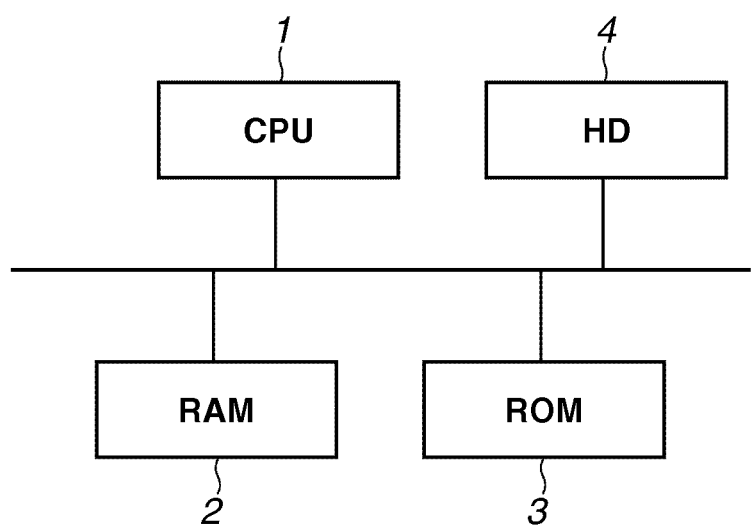
FIG. 1 illustrates an example of a hardware configuration of an image processing apparatus.

FIG. 1 illustrates an example of an image processing apparatus 100. Referring to FIG. 1, the image processing apparatus 100 includes a central processing unit (CPU) 1, a random access memory (RAM) 2, a read-only memory (ROM) 3, and a hard disk (HD) 4. The CPU 1 performs the function of the image processing apparatus 100, and performs processes according to flowcharts to be described below by executing programs stored in the ROM 3 or the HD 4. The RAM 2 stores data to be used by the CPU 1 when executing the programs. The ROM 3 stores a boot program to be read when the image processing apparatus 100 is activated. The HD 4 stores the programs according to the present exemplary embodiment. The RAM 2 also includes a frame buffer to be described below. Further, the image processing apparatus 100 includes hardware of an interface (not illustrated) that communicates with an imaging apparatus and a display device to be described below.

Figure 2:
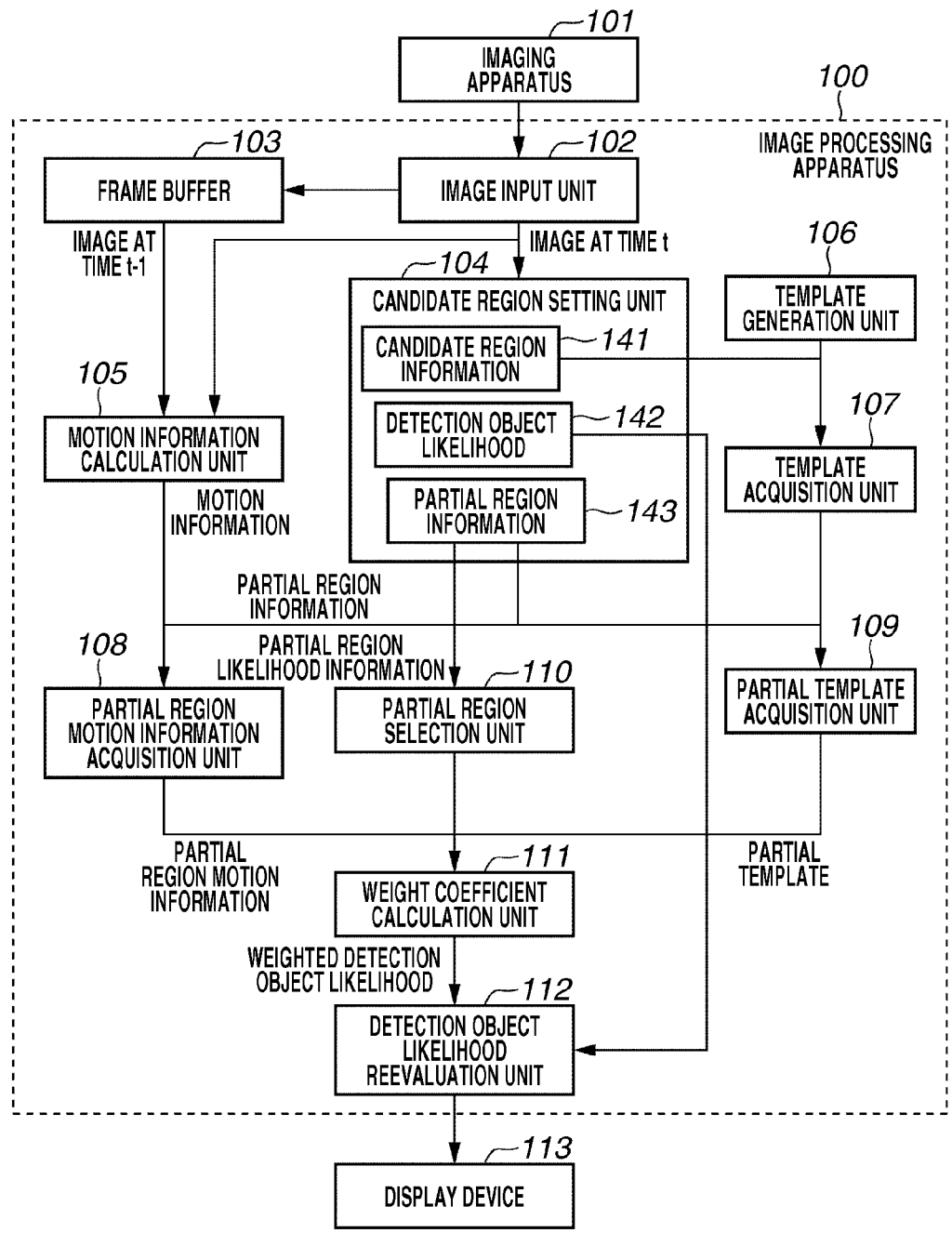
FIG. 2 illustrates an example of a functional configuration of an image processing apparatus according to a first exemplary embodiment of the present invention.
Figure 3:
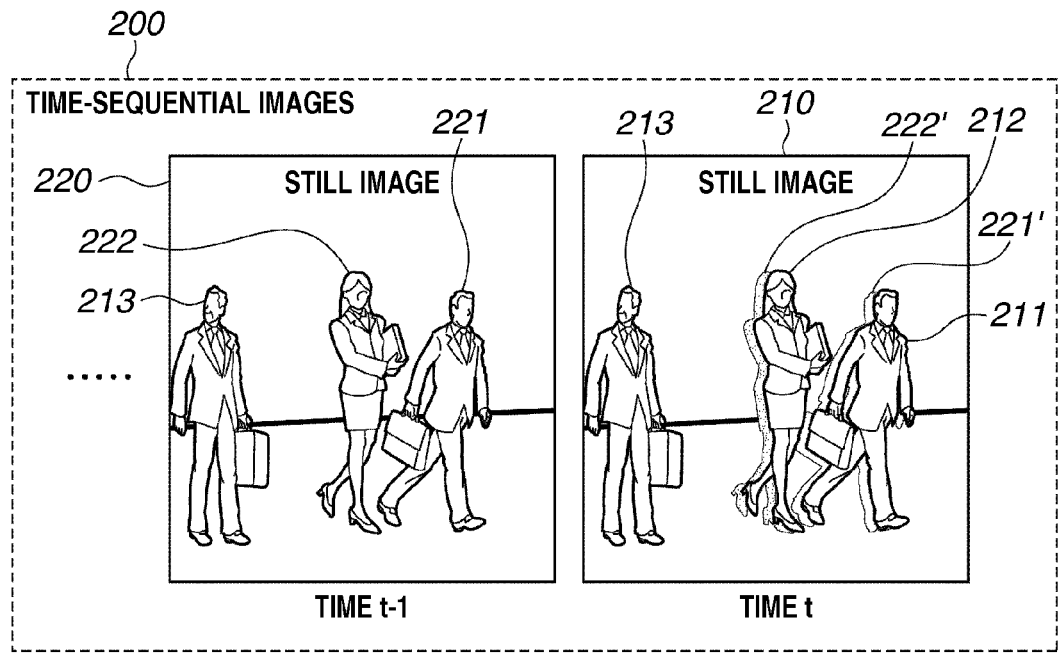
FIG. 3 illustrates an example of an input of a plurality of time-sequential still images.

FIG. 2 illustrates an example of a functional configuration of the image processing apparatus 100 according to a first exemplary embodiment of the present invention. FIG. 3 illustrates an example of input of a plurality of time-sequential still images.

Referring to FIG. 2, an imaging apparatus 101 acquires time-sequential images. The imaging apparatus 101 is an apparatus such as a camera or a video camera that is capable of continuously acquiring images. It is assumed that the imaging apparatus 101 is a fixedly-arranged camera. However, if the motion information of the person can be separated using an optical flow, the imaging apparatus 101 may be a camera that is movable.

An image input unit 102 acquires (or inputs) a still image 210 illustrated in FIG. 3 in which a moving person is captured at time t, from continuous images 200 acquired by the imaging apparatus 101. Further, the image input unit 102 stores in a frame buffer 103, a still image 220 of time t−1 acquired from the imaging apparatus 101.

A man 211, a woman 212, and a man 213 are captured in the still image 210 of time t. According to the present exemplary embodiment, the three persons are the detection objects.

The still image 220 of time t−1 stored in the frame buffer 103 is an image of a predetermined short period of time before the still image 210 of time t. In the still image 220, the man 213 has not moved as compared to the still image 210. In contrast, the man 211 and the woman 212 have moved to positions 221 and 222 respectively in the still image 220 as compared to the still image 210.

The position of the man 211 at time t−1 will be illustrated as a position 221' in the still image 210 of time t, and the position of the woman 212 at time t−1 will be illustrated as a position 222' in the still image 210 of time t, for ease of description. The images of the man 211 and the woman 212 at the positions 221' and 222' are not actually captured in the still image 210. It can thus be recognized that the man 211 has moved from the position 221 to 211, and the woman 212 has moved from the position 222 to 212 in the image during a predetermined short period of time. Further, it can be recognized that the man 213 has not moved.

A candidate region setting unit 104 illustrated in FIG. 2 outputs a candidate region 141 and a detection object likelihood 142. The candidate region 141 indicates a position at which an existence probability of a person is high in the still image 210 of time t and a shape of such a position. The detection object likelihood 142 corresponds to the existence probability with respect to the candidate region 141.

The candidate region setting unit 104 extracts feature amounts for detecting the three persons, i.e., the detection objects, from the still image 210 at time t. More specifically, the candidate region setting unit 104 calculates the feature amount based on a brightness gradient, and performs recognition by referring to a previously prepared template (i.e., a learning dictionary). According to the present exemplary embodiment, the HOG feature amount will be used as the feature amount for performing human detection. A detection method using a latent support vector machine (SVM) described in Felzenszwalb, P. McAllester, D. Ramanan, D. "A Discriminatively Trained, Multiscale, Deformable Par Model", Computer Vision and Pattern Recognition, 2008, CVPR 2008, IEEE Conference on Publication Date: 22-28, Jun. 2008, will be described below as an example of a method for the candidate region setting unit 104 to calculate the candidate region 141 from the still image 210 of time t.

Figure 4:
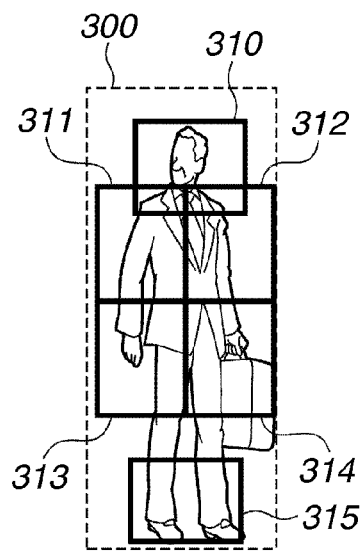
FIG. 4 illustrates an example of learned route filter and parts.

When performing learning, the latent SVM sets a region corresponding to the candidate region 141 which is an entire region of the person as supervised data to extract six parts from the region. Learning is then performed. According to the present exemplary embodiment, six parts 310, 311, 312, 313, 314, and 315 illustrated in FIG. 4 are extracted as a result of the above-described process. Learning which takes into account deformation and individual difference can be performed by allowing each part to move (become deformed) with respect to a root filter 300 when performing learning.

The candidate region setting unit 104 then hypothesizes the root filter 300 as the candidate region 141 on the still image 210 based on the learning result, and individually searches for each of the parts 310, 311, 312, 313, 314, and 315. The candidate region setting unit 104 thus generates a likelihood map for each part on the still image 210 (i.e., according to the present exemplary embodiment, six likelihood maps are generated).

The candidate region setting unit 104 then selects, with respect to the hypothesized root filter 300, a combination of part positions in which the likelihood of each part is greatest and a deformation cost is small, using the likelihood maps. An energy function E illustrated in equation (1) is employed to select such a combination.

$$E = \sum_{i=0}^{n} F_i \phi(H, p_i) + \sum_{i=0}^{n} a_i \cdot (\overline{x}_i, \overline{y}_i) + b_i \cdot (\overline{x}_i^2, \overline{y}_i^2) \qquad (1)$$

The candidate region setting unit 104 applies the above-described operation to all regions in which the root filter 300 may exist, and sets the regions in which the calculated energy E exceeds a predetermined threshold value as the candidate regions of the detection target. The candidate region setting unit 104 thus sets the calculated energy E as the detection object likelihood 142 of the root filter 300, and the position and shape of the root filter 300 as the candidate region 141. Further, the candidate region setting unit 104 sets the position, shape, and the partial region likelihood of each of the parts 310, 311, 312, 313, 314, and 315 used for determining the detection object likelihood as partial region information 143. The candidate region setting unit 104 thus sets the detection target candidate region.

According to the present exemplary embodiment, the latent SVM is used as the method for setting the candidate region. However, this is not a limitation, and other methods may be used as long as detection is performed using the partial regions. For example, a detection method such as Bag of Words (BoW) or HOG+AdaBoost which sets the partial regions of the candidate region from the image and performs comparison for each partial region may be used.

A motion information calculation unit 105 illustrated in FIG. 2 calculates the motion information using the still image 220 of time t−1 stored in the frame buffer 103 and the still image 210 of time t input from the image input unit 102. According to the present exemplary embodiment, the moving information calculation unit 105 performs the interframe difference method that extracts the regions that have changed between the images by acquiring the difference between the still images 210 and 220. The motion information calculation unit 105 thus calculates the motion information indicating the motion in an edge region of the moving object. The method for calculating the motion information is not limited to the above, and other methods may be used as long as the method describes the information which changes along time. For example, the background difference method or the optical flow method may be used.

A template generation unit 106 employs, when the moving information calculation unit 105 uses the interframe difference method so that the difference indicates the motion of the edge, an average gradient as a template. More specifically, the candidate region setting unit 104 calculates the average gradient for the image information in the root filter 300 normalized with respect to a still image group used in performing learning by employing a large amount of learning data. The candidate region setting unit 104 thus acquires an edge existence probability distribution of the detection object. According to the present exemplary embodiment, the template is generated using the average gradient. However, this is not a limitation, and other methods may be used as long as the motion information may be appropriately expressed.

Figure 7A:
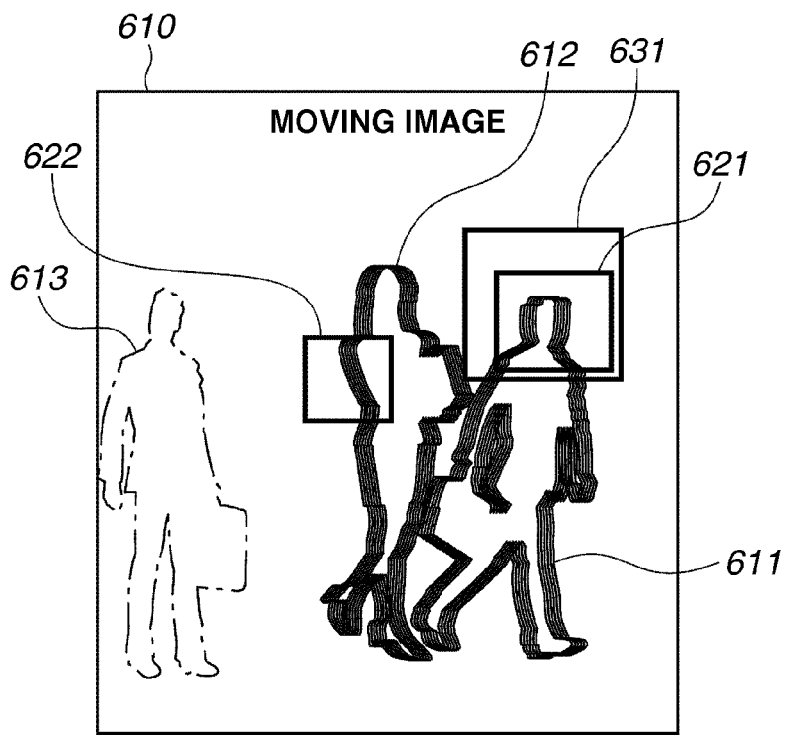
FIGS. 7A and 7B illustrate examples of the motion information and a template acquired by performing interframe difference processing.
Figure 7B:
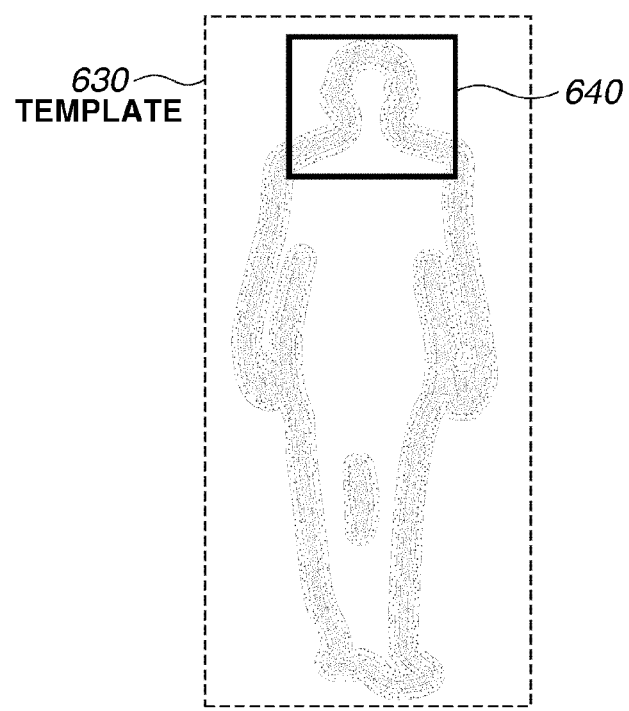

A template acquisition unit 107 deforms a template 630 illustrated in FIG. 7B that is generated by the template generation unit 106, using the candidate region 141 and the partial region information 143 calculated by the candidate region setting unit 104. The candidate region 141 output by the candidate region setting unit 104 is deformed according to a size of the detection object in the image. The template acquisition unit 107 thus deforms the template 630 generated by the template generation unit 106 according to a change in the shape of the candidate region 141 calculated by the candidate region setting unit 104.

A partial region motion information acquisition unit 108 outputs partial motion information as the motion information in the partial region, based on the partial region information 143 calculated by the candidate region setting unit 104. A partial template acquisition unit 109 acquires a partial template from the template deformed by the template acquisition unit 107, based on the partial region information 143 calculated by the candidate region setting unit 104.

A weight coefficient calculation unit 111 performs template matching based on the partial motion information acquired by the partial region motion information acquisition unit 108 and the partial template acquired by the partial template acquisition unit 109. More specifically, the weight coefficient calculation unit 111 determines whether the partial motion information in the partial region results from the edge of the detection object included in the template. The weight coefficient calculation unit 111 determines based on the motion information of the edge component acquired by performing interframe difference processing in the partial region information, and the existence probability information of the edge in the template. The weight coefficient calculation unit 111 then calculates a weighted partial region likelihood by multiplying a weight coefficient to the partial region likelihood. The weight coefficient expresses whether the motion indicated by the motion information is appropriate as the motion of the detection object. As a result, if the region moving in the image results from the motion of the detection target, the weight becomes large. On the other hand, if the component resulting from the motion of the detection target is small even when the region is moving, the weight becomes small.

A detection object likelihood reevaluation unit 112 reevaluates the candidate region set by the candidate region setting unit 104, using the weighted partial region likelihood, and outputs the candidate region reevaluated employing the motion information. A display device 113 displays the result (the reevaluated candidate region), i.e., the detection result, to a user.

The processes performed and the results acquired according to the present exemplary embodiment will be described below with reference to FIGS. 5A, 5B, 6A, 6B, 7A, and 7B. Detection of the persons 211, 212, 213, i.e., the detection objects, from the still image 210 of time t and the still image 220 of time t−1 illustrated in FIG. 3 will be described as an example.

Figure 5A:
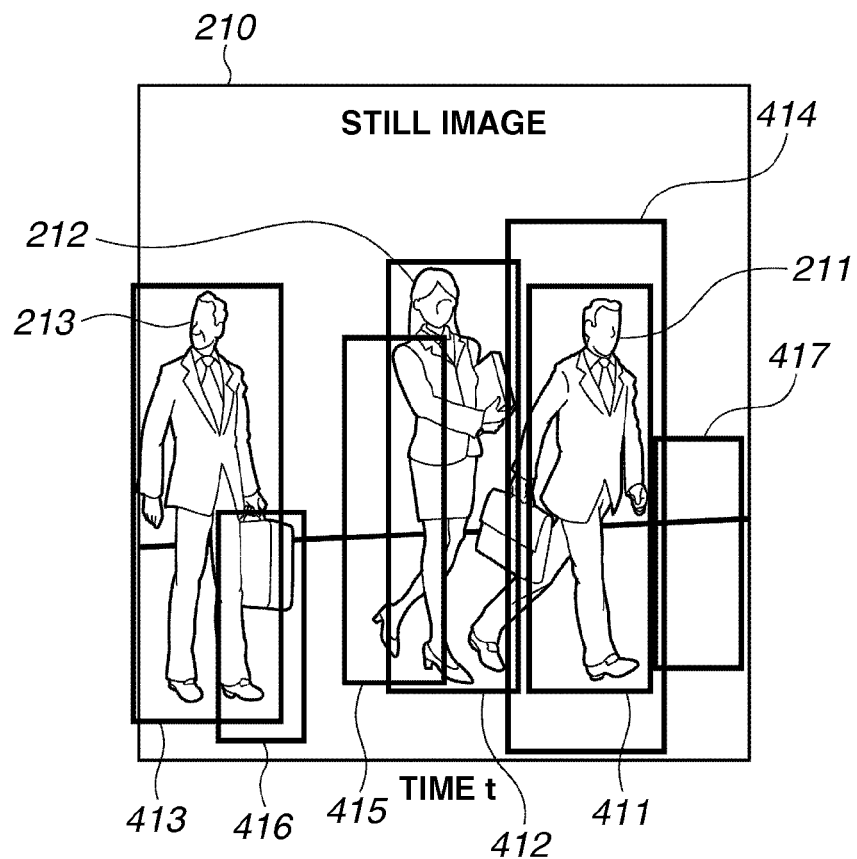
FIGS. 5A and 5B illustrate examples of candidate regions and detection object likelihoods.
Figure 5B:
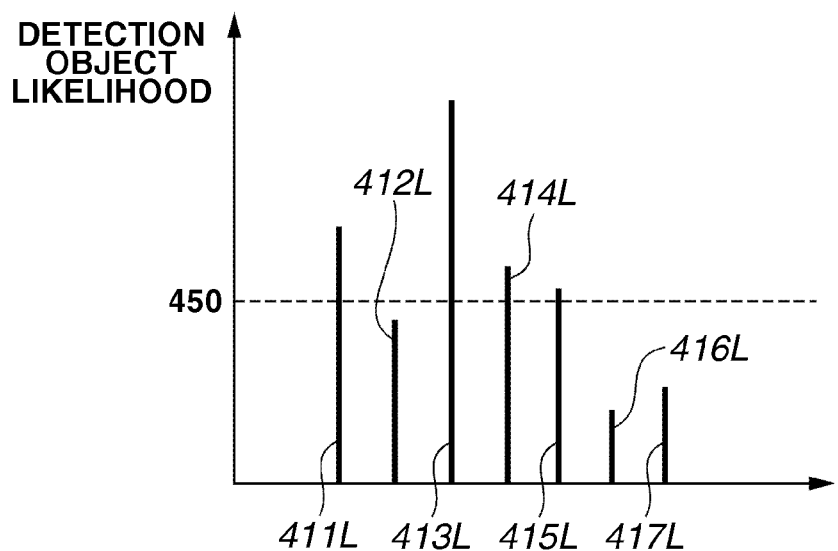

FIGS. 5A and 5B illustrate examples of the candidate region 141 and the detection object likelihood 142 output from the candidate region setting unit 104. The candidate region setting unit 104 detects candidate regions 411, 412, 413, 414, 415, 416, and 417 of the persons 211, 212, and 213 in the still image 210. The candidate region setting unit 104 also outputs detection object likelihoods 411L, 412L, 413L, 414L, 415L, 416L, and 417L corresponding to each of the candidate regions 411, 412, 413, 414, 415, 416, and 417 of the persons 211, 212, and 213.

More specifically, the candidate region setting unit 104 uses a threshold value 450 that is illustrated in FIG. 5B to set the regions to be described below among the candidate regions 411, 412, 413, 414, 415, 416, and 417 of the persons 211, 212, and 213. The candidate region setting unit 104 detects the candidate regions 411 and 414 of the man 211 using the detection object likelihoods 411L and 414L. On the other hand, since the detection object likelihood 412L is less than the threshold value 450, the region 412 which is the candidate region of the woman 212 is not detected. The candidate region setting unit 104 detects the candidate region 413 of the man 213 using the detection object likelihood 413L, and performs an error in detecting the candidate region 415 using the detection object likelihood 415L. Further, since the detection object likelihoods 416L and 417L are less than the threshold value 450, the regions 416 and 417 are not erroneously detected.

As described above, regions corresponding to two persons have been detected for the man 211, none for the woman 212, and a region corresponding to one person for the man 213 as a result of performing human detection using the still images. The image processing apparatus 100 then performs reevaluation of the acquired results using the motion information.

Figure 6A:
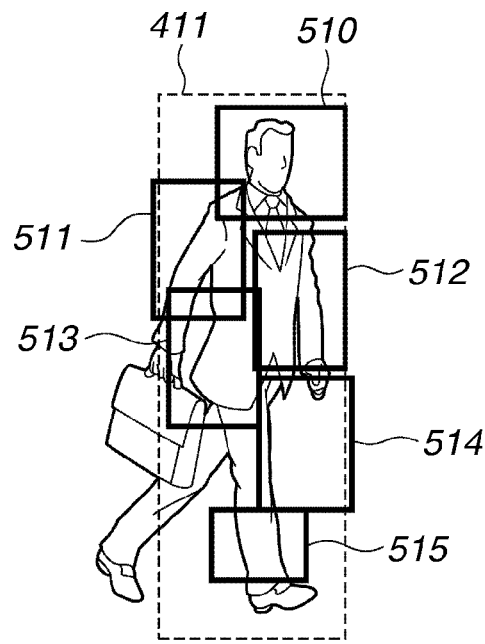
FIGS. 6A and 6B illustrate partial region information used for setting the candidate regions of a person.
Figure 6B:
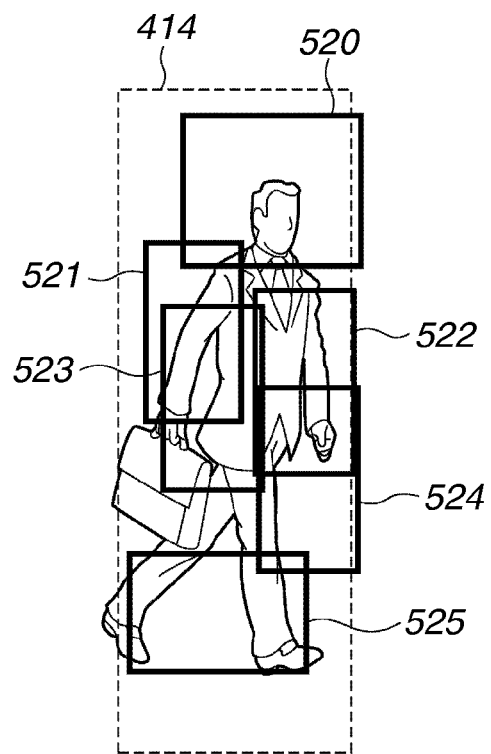

FIGS. 6A and 6B illustrate examples of the partial region information used by the candidate region setting unit 104 to set the candidate regions 411 and 414 of the man 211. Referring to FIGS. 6A and 6B, the candidate region setting unit 104 outputs the information on partial regions 510, 511, 512, 513, 514, and 515 of the candidate region 411, and the information on partial regions 520, 521, 522, 523, 524, and 525 of the candidate region 414.

FIG. 7A illustrates an example of motion information 610 between time t−1 and time t acquired by the motion information calculation unit 105 by performing interframe difference processing. FIG. 7B illustrates an example of the template 630 generated by the template generation unit 106. Referring to FIG. 7A, regions 611, 612, and 613 indicate motion information corresponding to the persons 211, 212, 213 respectively. Since the man 213 in FIG. 7A is not moving between the frames, there is hardly any motion information.

The motion information acquired by the motion information calculation unit 105 expresses the motion information of the edge region. The template generation unit 106 thus calculates the average gradient (hereinafter referred to as AG) from a plurality of detection object images and sets the AG as the template, to indicate the existence probability of the edge region of the detection object in the root filter.

More specifically, the candidate region setting unit 104 collects and normalizes a human image data group for learning the candidate regions. The template generation unit 106 then addition-averages the edge images that are extracted by applying an edge extraction filter such as a Sobel filter to each of the images. The template generation unit 106 thus acquires the AG, and sets the image as the template 630.

The template generation unit 106 aligns, when generating the template, the position of each image data group, so that a gravitational center point of each of the parts 310, 311, 312, 313, 314, and 315 calculated when performing learning, becomes a reference point. The template generation unit 106 then performs addition-averaging, and thus calculates the AG which is different for each partial region. If the addition-averaging is performed by using the gravitational center point of the part 310 corresponding to the head as an origin, variation at the part 315 near the feet becomes large, so that the existence probability of the AG becomes dispersed. The template generation unit 106 thus generates the templates for each part by focusing on the part. A head partial region template 640 illustrated in FIG. 7B is a template corresponding to the head partial region.

According to the present exemplary embodiment, the template 630 is generated from the image data group used in performing learning. However, this is not a limitation, and statistical information of the HOG feature amount in the image may be used as long as the statistical information indicates the feature of the motion information in the template. Further, a template acquired using the optical flow method in which the motion of the region is reflected in the motion information, and a segmentation method such as a graph-cut method which performs region extraction on an average value of the actual image, may also be used. Furthermore, a template not limited to the edge which is effective in performing reevaluation, such as the motion information based on the region, may be used by combining templates acquired by performing the background difference method.

An example of a process for reevaluating the detection object likelihood 142 calculated by the candidate region setting unit 104 as described above, using the motion information of the candidate region 411 will be described below.

A partial region selection unit 110 illustrated in FIG. 2 preferentially sets using the partial region likelihoods, the partial region that greatly contributes to detection of the candidate region, and a region previously assumed to be highly reliable such as the head partial region. A comparison is performed using the parts of high degree of contribution to remove the effect of concealment. In the present example, a head partial region 510 illustrated in FIG. 6A is selected as the highly contributing region.

According to the present exemplary embodiment, the partial region selection unit 110 selects a single partial region. However, this is not a limitation, and the partial region selection unit 110 may select (extract) a plurality of partial regions. Further, according to the present exemplary embodiment, the partial region selection unit 110 extracts the partial region of high likelihood. However, this is not a limitation, and a likelihood region appropriate for eliminating erroneous detection may be set, such as a region near the threshold value. Furthermore, the partial region selection unit 110 may select the partial region using only the position information of the partial region.

The partial region motion information acquisition unit 108 extracts motion information 621 of the head partial region illustrated in FIG. 7A, from the motion information 610 output from the motion information calculation unit 105. The partial region motion information acquisition unit 108 extracts the motion information 621 based on the information of the head partial region 510 in the candidate region 411 illustrated in FIG. 6A. The partial template acquisition unit 109 then extracts the head partial region template 640 from the template 630 with respect to the head partial region 510 selected by the partial region selection unit 110.

The weight coefficient calculation unit 111 then performs masking with respect to the head partial region template 640 using the motion information 621 of the head partial region.

$$AREA_{temp} = \sum_{x=0}^{X} \sum_{y=0}^{Y} (I_{temp}) \quad (2)$$

$$AREA_{head} = \sum_{x=0}^{X} \sum_{y=0}^{Y} (I_{temp} \times I_{move}) \quad (3)$$

$$w_{head} = a \frac{AREA_{head}}{AREA_{temp}} \quad (4)$$

$AREA_{temp}$ in Equation (2) indicates the edge existence probability in the head partial region template 640. $AREA_{head}$ in equation (3) indicates an amount of the actual motion of the edge of the head in the template 640. $AREA_{head}$ is acquired by multiplying the existence probability of the edge in each position in the head partial region template 640 by a coefficient acquired by normalizing the motion information 621 of the head partial region to 0.0 to 1.0.

The weight coefficient calculation unit 111 then calculates a weight coefficient $W_{head}$ based on the motion information, using equation (4). A value of the weight coefficient $W_{head}$ increases as the motion information 621 in the head partial region 510 becomes closer to the edge existence probability of the head partial region template 640. If the motion information 621 and the edge existence probability hardly match, or if the motion component does not exist, the weight coefficient $W_{head}$ becomes approximately 1.0.

Figure 8:
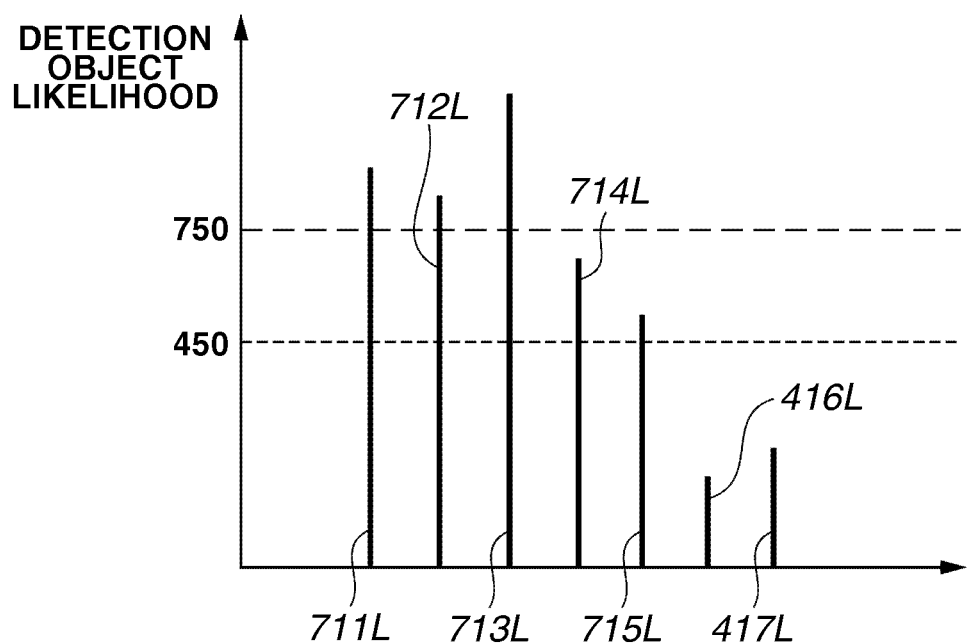
FIG. 8 illustrates a process for reevaluating the detection object likelihood.

FIG. 8 illustrates a process for reevaluating the detection object likelihood. Referring to FIG. 8, the detection object likelihood reevaluation unit 112 changes the detection object likelihood 411L illustrated in FIG. 5A to a detection object likelihood 711L illustrated in FIG. 8, using the calculated weight coefficient $W_{head}$. As a result, the likelihood of the candidate region 411 illustrated in FIG. 5A increases, and if the candidate region 411 is reevaluated using a threshold value 750 for reevaluation, the detection object likelihood exceeds the threshold value 750. The detection object likelihood reevaluation unit 112 thus outputs the candidate region 411 as the detection result of the man 211.

The detection object likelihood reevaluation unit 112 then reevaluates the candidate region 412 illustrated in FIG. 5A similarly as the candidate region 411. As a result, the detection object likelihood 412L increases to a detection object likelihood 712L and exceeds the threshold value 750. The detection object likelihood reevaluation unit 112 can thus detect the woman 212 that was not detectable by the candidate region setting unit 104.

In the case of the man 213 who has not moved, the motion region 613 illustrated in FIG. 7A corresponding to the candidate region 413 illustrated in FIG. 5A becomes approximately 0, and a result of reevaluation using the motion information cannot be expected. However, if the detection object likelihood 413L is large in terms of a degree of detection object likelihood, a detection object likelihood 713L acquired after reevaluation exceeds the threshold value 750 even if the values are approximately the same. It thus becomes likely for the detection object likelihood reevaluation unit 112 to detect the candidate region 413.

The size of the candidate region 414 affects the head partial region 520 illustrated in FIG. 6B selected by the partial region reselection unit 110, so that the head partial region 520 becomes a large region as indicated by the head partial region 631 illustrated in FIG. 7A. If the weight coefficient calculation unit 111 then calculates the weight coefficient $W_{head}$ using the head partial region 631 and the head partial region template 640 illustrated in FIG. 7B, the weight coefficient $W_{head}$ becomes smaller than the weight coefficient of the candidate region 411. It thus becomes more likely for the detection object likelihood 714L acquired by reevaluating the candidate region 414 not to exceed the threshold value 750, and the candidate region 414 to become eliminated as erroneous detection.

The weight coefficient calculation unit 111 then calculates the weight coefficient $W_{head}$ with respect to the head partial region 622 illustrated in FIG. 7A of the candidate region 415 illustrated in FIG. 5A, based on the head partial region 520 selected by the partial region reselection unit 110. In such a case, since the region matching the head partial region template 640 is small, the weight coefficient $W_{head}$ becomes approximately 1.0, and there is hardly any improvement in the likelihood using the motion information.

When the threshold value 750 is higher than the threshold value 450, the detection object likelihood of the non-moving object becomes relatively reduced. It thus becomes more likely for the candidate region 415 which is detected close to the threshold value 450 to be eliminated.

As described above, the image processing apparatus 100 is capable of improving the detection target likelihood and eliminating the detection object that is erroneously detected, even when the moving object may stop moving or when the detection object likelihood is less than the threshold value.

According to the first exemplary embodiment, the detection object likelihood reevaluation unit 112 reevaluates the detection object likelihood 142 of the still image using the motion information, based on the detection results of the candidate regions detected in the still image by the candidate region setting unit 104.

According to a second exemplary embodiment of the present invention, the detection object likelihood reevaluation unit 112 is included in the candidate region setting unit 104. The second exemplary embodiment will be described below using HOG+AdaBoost human detection method.

Figure 9A:
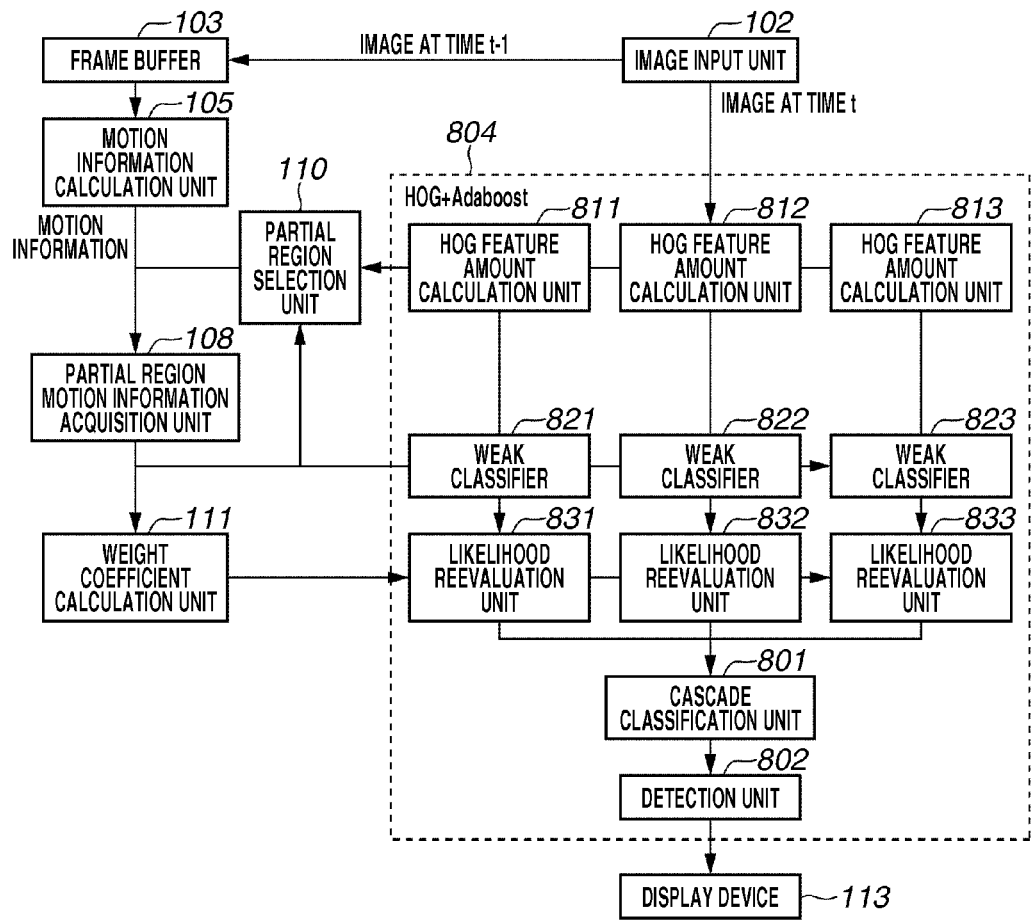
FIG. 9A illustrates an example of a functional configuration of the image processing apparatus.
Figure 9B:
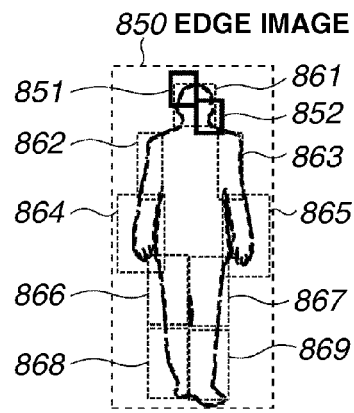
FIG. 9B illustrates an example of a learning image divided into partial regions according to a second exemplary embodiment of the present invention.

FIG. 9 illustrates an example of the functional configuration of the image processing apparatus 100 according to the second exemplary embodiment. Referring to FIG. 9A, a detection device 804 employing the HOG+AdaBoost human detection method hypothesizes the candidate region 141 in the still image acquired by the image input unit 102, using an appropriate method such as a sliding window method. HOG feature amount calculation units 811, 812, and 813 divide the candidate region 141 into units of cells and blocks and calculates the HOG feature amount for each block. Weak classifiers 821, 822, and 823 process the HOG feature amounts calculated by the HOG feature amount calculation unit 811, 812, and 813, and calculate the detection object likelihood of each HOG feature amount in the still image.

The partial region selection unit 110 then selects a partial region from the HOG feature amounts, and outputs the partial region as the partial region information 143 to the partial region motion information acquisition unit 108. The partial region selection unit 110 previously divides a learning image (i.e., an edge image) 850 illustrated in FIG. 9B into regions that can be approximated as a rigid body, such as regions 861, 862, 863, 864, 865, 866, 867, 868, and 869. The partial region selection unit 110 thus generates a set of partial regions that may be viewed as a single rigid body.

The partial region motion information acquisition unit 108 calculates the optical flow with respect to the motion information acquired by the motion information calculation unit 105, as the motion information of the partial region. The weight coefficient calculation unit 111 calculates the weight coefficient by determining whether each partial region is the motion of the single rigid body, according to a direction and coherency of the size of a motion vector, based on each of the partial region motion information in the set of the partial region information selected by the partial region selection unit 110.

The weight coefficient calculation unit 111 then applies the calculated weight coefficient to likelihood reevaluation units 831, 832, and 833 that reevaluate the likelihood using the motion information. A cascade classification unit 801 performs evaluation employing the AdaBoost technique, using the likelihood reevaluated based on the motion information, and the result is output to a detection unit 802.

As a result of performing the above-described process, an object recognition apparatus can be formed, in which the weak classifier outputs the reevaluation result using the motion information to the cascade classification unit.

The present invention may also be achieved by supplying software (program code) for realizing functions of the above-described exemplary embodiments to a system or an apparatus via a network or various recording media, and a computer (or a central processing unit (CPU) or a micro processing unit (MPU)) of the system or the apparatus reading and executing the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-196872 filed Sep. 2, 2010, which is hereby incorporated by reference herein in its entirety.

What is claimed is:

1. An image processing apparatus comprising:
    an input unit configured to input a plurality of time-sequential images;
    a first setting unit configured to set, in an image among the plurality of images, a candidate region that is a candidate of a region in which an object exists;
    a likelihood acquisition unit configured to acquire a likelihood for the candidate region;
    a motion acquisition unit configured to acquire motion information of an edge of the object based on the image and another image that is time-sequential to the image;
    a determination unit configured to determine whether an edge in the set candidate region corresponds to the edge of the object based on the acquired motion information of the edge;
    a second setting unit configured to set a weight value for the candidate region based on a result of determination by the determination unit;
    a correction unit configured to correct the likelihood for the candidate region based on the set weight value; and
    a detection unit configured to detect the object from the image based on the corrected likelihood.

2. The image processing apparatus according to claim 1, further comprising a distribution acquisition unit configured to acquire an existence probability distribution of the edge of the object, which is obtained by calculating an average gradient in a plurality of learning images,
    wherein the determination unit determines whether the edge in the set candidate region corresponds to the edge of the object by using the acquired motion information of the edge and the existence probability distribution of the edge of the object.

3. The image processing apparatus according to claim 2, wherein the second setting unit sets a larger weight value accordingly as a component resulting from the edge of the object increases in the edge of which the motion information is acquired.

4. The image processing apparatus according to claim 1, wherein the first setting unit includes a plurality of classification units.

5. The image processing apparatus according to claim 1, wherein the object is a human figure.

6. The image processing apparatus according to claim 1, further comprising:
    a detection unit configured to detect the object from the image when the corrected likelihood exceeds a threshold value.

7. The image processing apparatus according to claim 1, wherein the detection unit is configured to detect the object using HOG +Adaboost human detection method.

8. The image processing apparatus according to claim 1, wherein the second setting unit is configured to set the weight value by determining whether a partial region of the image includes motion of a single body.

9. The image processing apparatus according to claim 1, wherein the motion acquisition unit is configured to acquire motion information by calculating optical flow.

10. The image processing apparatus according to claim 1, wherein the candidate region is a partial region of the image.

11. The image processing apparatus according to claim 1, further comprising:
    a selection unit configured to select a partial region from the candidate region.

12. The image processing apparatus according to claim 1, wherein the first setting unit is configured to set the candidate region using latent SVM.

13. The image processing apparatus according to claim 1, wherein the first setting unit is configured to set the candidate region using Bag of Words.

14. The apparatus according to claim 1,
    wherein the setting unit sets, further in the candidate region, a partial region, wherein the motion acquisition unit acquires motion information of the edge of the object for the set partial region, based on the image and another image that is time-sequential to the image,
    wherein the determination determines whether the edge in the set partial region corresponds to the edge of the object based on the acquired motion information of the edge,
    wherein the second setting unit sets the weight value for the set partial region based on a result of determination by the determination unit,
    wherein the correction unit corrects the likelihood for the partial region based on the set weight value, and
    wherein the detection unit detects the object from the image by integrating the corrected likelihood for the partial region.

15. The apparatus according to claim 1, wherein the second setting unit sets a larger weight value for the candidate region accordingly as the edge corresponding to the edge of the object increases in the candidate region.

16. An image processing method comprising:
    inputting a plurality of time-sequential images;
    setting, in an image among the plurality of images, a candidate region that is a candidate of a region in which an object exists;
    acquiring a likelihood for the candidate region;
    acquiring motion information of an edge of the object based on the image and another image that is time-sequential to the image;
    determining whether an edge in the set candidate region corresponds to the edge of the object based on the acquired motion information of the edge;
    setting a weight value for the candidate region based on a result of determining;
    correcting the likelihood for the candidate region based on the set weight value; and
    detecting the object from the image based on the corrected likelihood.

17. A non-transitory storage medium containing instructions that, when executed by a processor, cause the processor to perform operations comprising:
    inputting a plurality of time-sequential images;

setting, in an image among the plurality of images, a candidate region that is a candidate of a region in which an object exists;

acquiring a likelihood for the candidate region;

acquiring motion information of an edge of the object based on the image and another image that is time-sequential to the image;

determining whether an edge in the set candidate region corresponds to the edge of the object based on the acquired motion information of the edge;

setting a weight value for the candidate region based on a result of determining;

correcting the likelihood for the candidate region based on the set weight value; and detecting the object from the image based on the corrected likelihood.

* * * * *